June 5, 1923.

J. VIGLIANO

ROTARY ENGINE

Filed Jan. 23, 1920

1,457,951

3 Sheets-Sheet 1

Inventor
J. Vigliano
By his Attorney
Sigmund Herzog

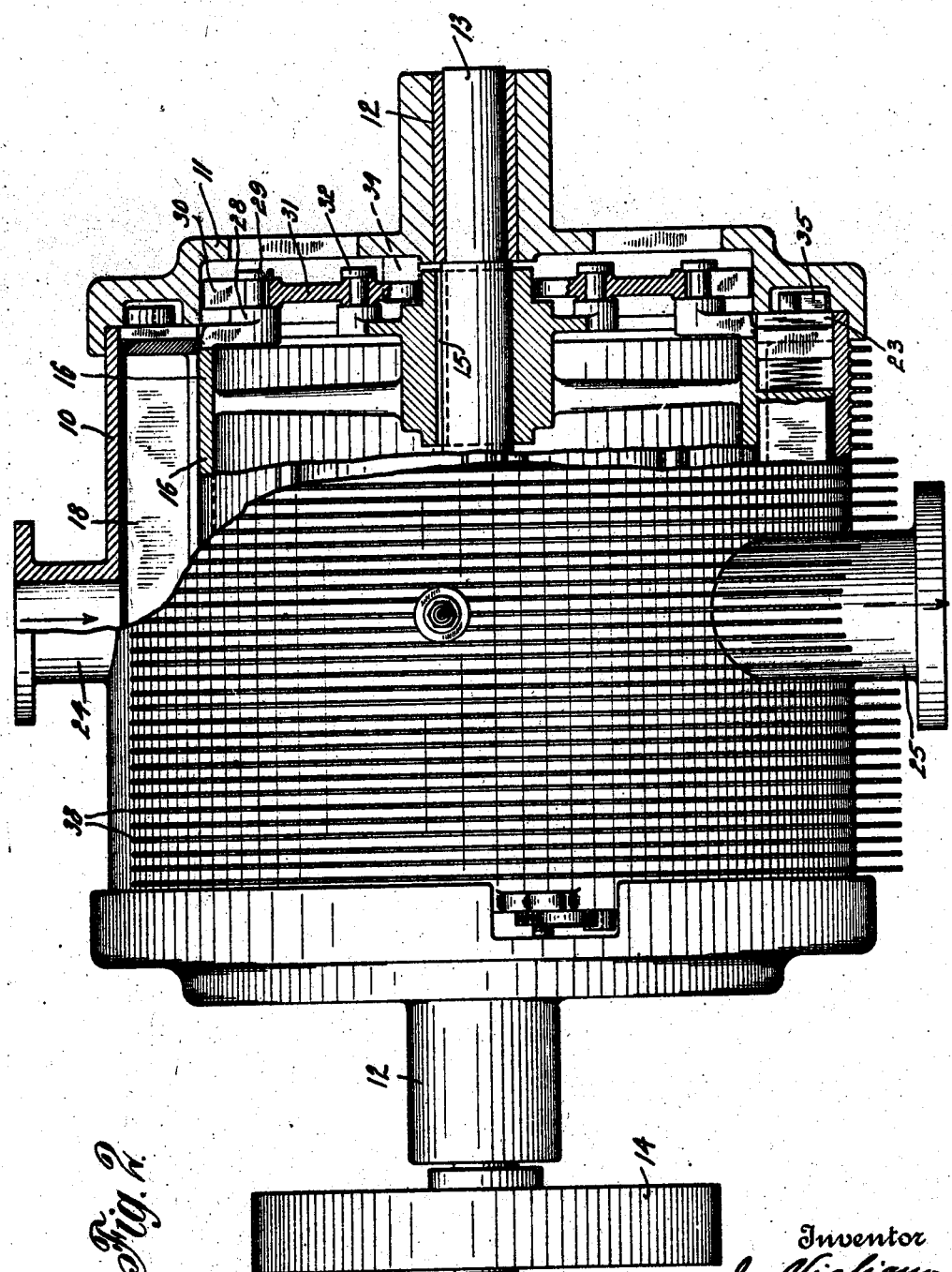

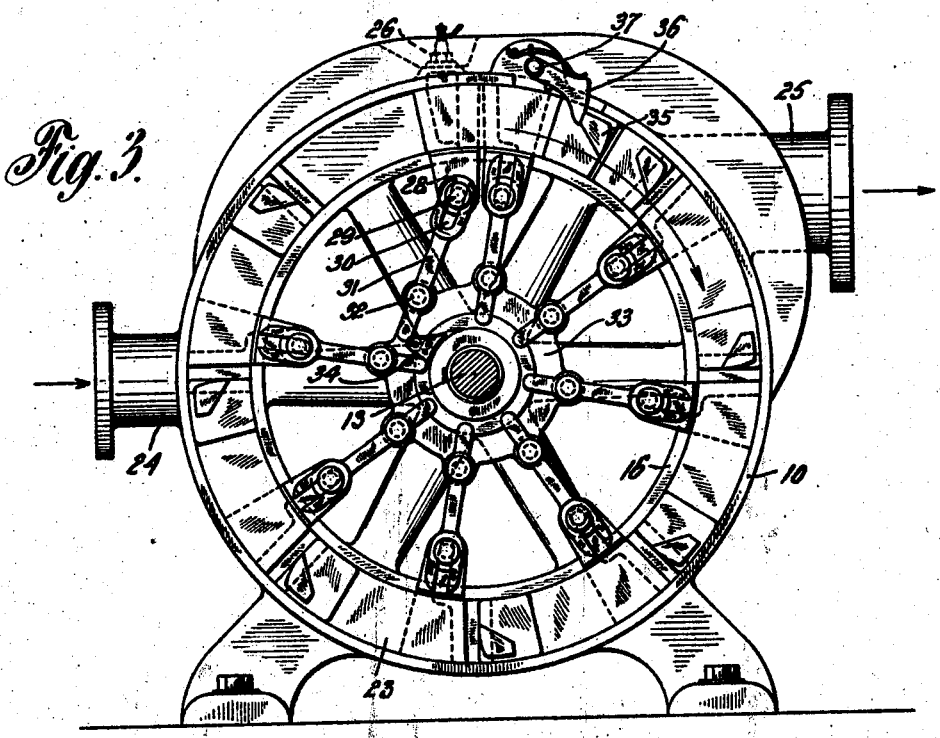
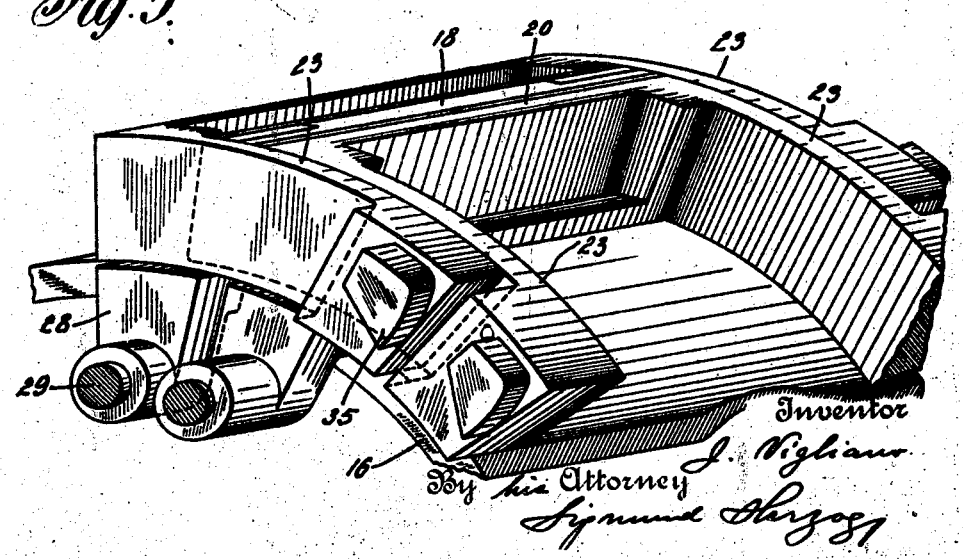

Patented June 5, 1923.

1,457,951

UNITED STATES PATENT OFFICE.

JOSEPH VIGLIANO, OF NEW YORK, N. Y.

ROTARY ENGINE.

Application filed January 23, 1920. Serial No. 353,434.

*To all whom it may concern:*

Be it known that I, JOSEPH VIGLIANO, a citizen of the United States, and a resident of New York, in the county of New York and State of New York, have invented certain new and useful Improvements in Rotary Engines, of which the following is a specification.

The present invention relates to internal combustion engines, and more particularly to rotary motors.

The main object of the invention is to provide an engine of the type mentioned which is of comparatively light weight in proportion to the amount of power that it is capable of developing, and one that consists of few simple parts which are adapted to be readily manufactured and assembled.

Another object of the invention is to provide a rotary engine having a cycle of operations that corresponds substantially to the four-stroke cycle, with all the advantages of the reciprocating-piston engines without the disadvantages inherent in the constructions of the latter.

With these and other objects in view, which will more fully appear as the nature of the invention is better understood, the same consists in the combination, arrangement and construction of parts hereinafter described, pointed out in the appended claim and illustrated in the accompanying drawings, it being understood that any changes may be made in the size and proportion of the several parts and details of construction within the scope of the appended claim, without departing from the spirit or sacrificing any of the advantages of the invention.

One of the many possible embodiments of the invention is illustrated in the accompanying drawings, in which:—

Figure 1:
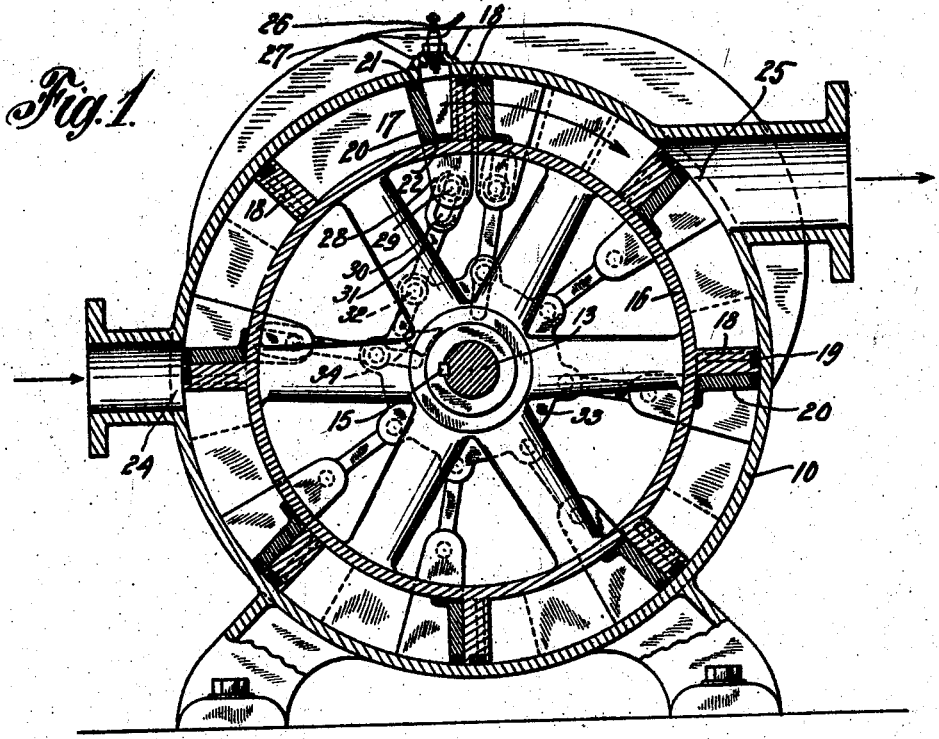
Figure 4:
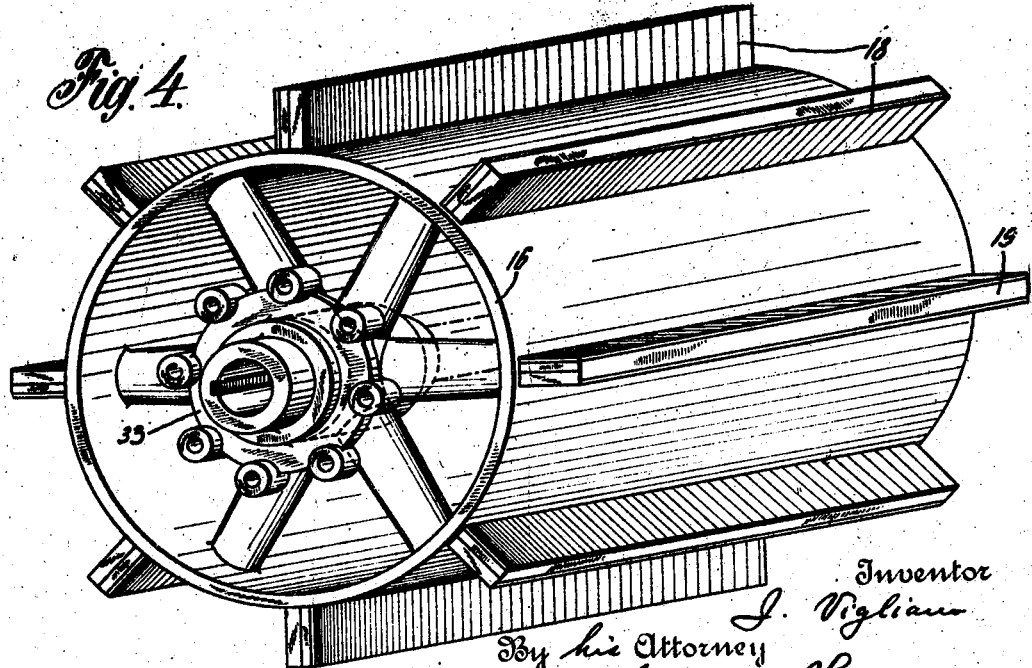

Figure 1 is a central vertical section taken through a rotary internal combustion engine constructed in accordance with the present invention; Fig. 2 is a top plan view thereof, partly in section; Fig. 3 is a side elevation of the same, the casing end being removed; Fig. 4 is a perspective view of the rotary element of the engine, certain parts being removed therefrom in order to more clearly show the construction; and Fig. 5 is a perspective view of a portion of the said rotary element, on a larger scale.

In the drawings, the numeral 10 indicates a stationary cylindrical casing, on the heads 11 of which are formed bearings 12. In these bearings is rotatably journaled a shaft 13, carrying outside of the casing a flywheel 14. The shaft passes centrally through the engine casing and has fixed thereto, for instance by a key 15, a rotary member 16 in the form of a drum. The cylindrical portion of this rotary member is disposed concentrically with the cylindrical portion of the casing, whereby an annular chamber 17 is formed. To the drum are fixed, or there may be made integral therewith, a plurality of equidistantly spaced radially extending vanes 18, the outer ends of which are in sliding contact with the inner face of the cylindrical wall of the casing, packing strips 19 being mounted upon said outer ends for the well-known purpose. The vanes extend substantially throughout the length of the drum and co-operate with radially extending vanes 20, which are slidably disposed upon the drum within the chamber 17. These vanes are provided at their outer and inner ends with packing strips 21 and 22, respectively, the former being in contact with the inner face of the cylindrical wall of the casing, and the packing strips 22 in contact with the outer face of the drum 16. Each slidable vane 20 is provided with arc-shaped flanges 23 upon its ends. Adjacent flanges on the ends of the slidable vanes are adapted to overlap, as clearly shown in Fig. 5 of the drawings. The flanges form the end members of the chamber 17, which is divided by the vanes into a plurality of compartments, each being adapted, in rotation, to receive a charge of combustible mixture through an intake port 24, the products of combustion leaving the chamber 17 through an exhaust port 25. Between these ports is disposed an igniting device 26 of any suitable construction, for instance a spark plug, that is connected by a wire 27 with a suitable stationary contact device, not shown, and adapted to make electrical contact with a timing device of any suitable construction, that is carried by the motor shaft.

Each sliding vane 20 is provided with two radial inwardly extending projections 28, carrying pins 29, that are seated in slots 30 of levers 31. These levers are fulcrumed at 32 to the hub 33 of the drum, their inner ends being adapted to coact with a cam 34, that is fixed to one of the heads 11 of the stationary casing of the engine.

Upon each flange of the sliding vanes is rigidly mounted a lug 35, adapted to co-operate with a spring-pressed pawl 36, pivoted at 37 to the stationary casing 10 and projecting into the path of the said lugs.

The casing 10 is provided with exterior radiating ribs 38, the engine shown being of the air-cooled type.

The operation of the engine is as follows:—As above stated, the engine operates under four-stroke cycle, that is to say a working period follows ignition of the charge, followed by exhaust, charging, and compression periods. In the case illustrated in the drawings, there are eight fixed vanes and eight sliding vanes provided, each pair of vanes, with the casing and drum, corresponding to an engine cylinder. Inasmuch as a single spark plug only is mounted on the engine, there will result eight ignitions during each complete revolution of the rotary element.

Before the levers 31 of a sliding vane reach the cam 34, the said vane is in contact with the fixed vane in rear thereof. When a compartment passes the intake port 24, its vanes are spaced apart, as far as the structure permits, and in this manner a combustible charge is drawn into the said compartment, the intake port 24 being in communication with a charge forming device of any suitable type. If found necessary, the fresh charge may be forced by a pump or other suitable means into the compartment. As soon as the compartment has passed the intake port, the levers 31 of its sliding vane come into contact with the cams 34, with the result that the said sliding vane is caused to move toward its stationary vane, thereby compressing the charge, the full point of compression being obtained when the fixed vane has just passed the spark plug 26. When in this position, the pawls 36 have just ridden over the lugs 35 on the sliding vane. The elements are shown in these positions in Fig. 1 of the drawings, at which point ignition takes place. The gases resulting from the ignition of the combustible mixture act on the vanes, tending to separate the same. Inasmuch as the movable vane is prevented by the pawls 36 from moving backwards, the entire force of the explosion will be spent on the fixed vane and consequently on the shaft 13.

After explosion, the movable vane is caused again to partake of the motion of the drum 16, the products of combustion leaving the compartment through the exhaust port 25 as the said compartment passes the port. If necessary, the expulsion of the gases may be aided by causing the movable vane to advance toward the fixed vane by a cam, not shown, acting upon the levers 31. It is obvious that suitable scavenging means may be employed. This means has not been shown as it does not form part of the present invention. The next compartment in the series repeats then the cycle of operation now described, and so on. In this manner a series of eight impulses will be imparted to the shaft 13 during each revolution thereof.

What I claim is:—

A rotary internal combustion engine, comprising a stationary cylindrical hollow body, a shaft centrally mounted thereon, a drum fixed to said shaft within said body and disposed concentrically therewith, fixed radial vanes on said drum having their outer ends in sliding contact with the inner face of said cylindrical body, a corresponding number of vanes carried by and slidably arranged on said drum, the outer ends of the last mentioned vanes being in contact with the inner face of said cylindrical body and their inner ends in contact with the outer face of said drum, said fixed and slidable vanes being arranged alternately and each slidable vane being provided with arc-shaped flanges on its ends, adjacent flanges on the slidable vanes being adapted to overlap and thus forming compartments in co-operation with said cylindrical body, drum and two sets of vanes, said cylindrical body being provided with an inlet port and an exhaust port, an ignition device between said ports, a lever engaging each sliding vane pivoted to said drum, a fixed cam co-operating with said levers for causing each sliding vane to reduce the size of its compartment after it has passed said inlet port, and means for preventing a backward motion, at the time of explosion, of each sliding vane, said fixed and sliding vanes moving always in the same direction.

Signed at New York, in the county of New York and State of New York, this 3rd day of January, 1920.

JOSEPH VIGLIANO.